United States Patent Office 3,431,074
Patented Mar. 4, 1969

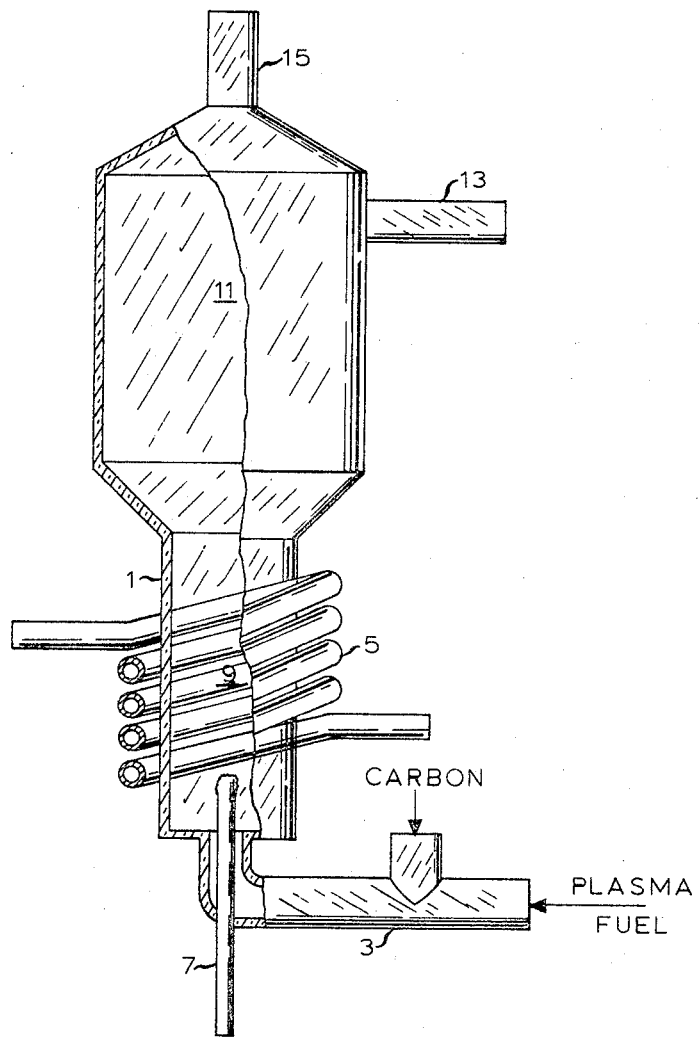

3,431,074
PROCESS FOR THE PRODUCTION OF HIGHLY
AMORPHOUS CARBON BLACK
Merrill E. Jordan, Walpole, Mass., assignor to Cabot Corporation, Boston, Mass., a corporation of Delaware
Filed Nov. 15, 1966, Ser. No. 594,446
U.S. Cl. 23—209.3                     5 Claims
Int. Cl. C09c 1/56

The present invention relates generally to carbon black and more particularly to a novel process for the production of highly amorphous carbon blacks.

Commercially, carbon black is produced by the decomposition of carbon containing materials which are usually essentially hydrocarbon in nature. The decomposition of the carbonaceous material can be achieved by various processes such as open flame decomposition (impingement or channel), enclosed direct flame decomposition, heated surfaces (thermal) or detonation or internal combustion processes (engine or energy utilizing systems), etc. In any of the above-mentioned processes, the temperatures involved rarely exceed about 3000° F. The basic properties of a black, and, therefore, the performance characteristics exhibited thereby in applications thereof, are determined in large measure by the particular process by which it is produced. For example, channel blacks or impingement type blacks, which are produced in the presence of air at temperatures of about 1700° F., are generally characterized by high surface area, low structure, high volatile content and low pH, and are particularly suitable for use as coloring agents, and as reinforcing agents in natural rubber. On the other hand, carbon blacks produced in an enclosed conversion zone at temperatures of about 2500° F., e.g. by the furnace process, may be produced over a wide range of closely controlled particles sizes and accordingly are adaptable as fillers for various synthetic rubbers and plastics. In spite of the vast body of technology surrounding the production of various carbon blacks it has heretofore been extremely difficult to produce highly amorphous carbon blacks by use of any of the above-described processes. Nevertheless, the advantages and applications of such blacks is well recognized.

Generally speaking, any carbon is to at least some degree crystalline in nature, i.e. the particle is composed of crystallites of finite dimensions having at least some degree of ordering. The more amorphous a carbon particle, however, the greater the lack of three dimensional order in the crystallite planes relative to one another. The greater the crystallinity, the more ordered will be the arrangement of crystallites. For comparative purposes graphite will hereinafter be considered as 100% crystalline. When examined by X-ray diffraction, graphite displays many absorption peaks which are clearly delineated. In the more amorphous carbon forms however, said peaks become less sharply delineated and lessen in numbers. For example, it is well known that carbon blacks which have been produced at or subjected to temperatures in excess of about 2700° C. are relatively crystalline in nature, e.g. about 30% of graphite crystallinity. Thus, most efforts directed towards the production of amorphous blacks have been predicated on the principle that the lower the temperature at which the black is produced, the more amorphous will be the product. Although said principle is generally valid, it has as yet been virtually impossible to produce blacks in accordance therewith having little or no ordered crystallite arrangement. For instance, channel blacks are normally produced at what is considered to be relatively low temperatures (about 1700° F.) and are of small particle diameters. However, the crystallinity of the product is rarely found to be below about 15% of the graphite standard. Said crystallinity is believed to contribute substantially to difficult dispersion characteristics of channel blacks in vehicles such as newsink oil, elastomers, paint vehicles, etc. A fuller understanding of carbon black crystallinity can be had by reference to "An X-ray Study of Carbon Black," Biscoe and Warren, Journal of Applied Physics, vol. 13, No. 6, pp. 364–371, June 1942.

In accordance with the present invention, however, carbon blacks are produced which possess desirably amorphous characteristics.

It is a principal object of the present invention to provide a novel process for the production of amorphous carbon black.

Other objects and advantages of the present invention will in part be obvious and will in part appear hereinafter.

The figure forming part hereof is a longitudinal sectional, diagrammatic view of a thermal plasma apparatus suitable for use in the process of the present invention.

In accordance with the present invention, it has been discovered that amorphous carbon black can be produced when there is charged into a thermal plasma zone a carbon feedstock and the recombining carbon nuclei are mixed with chlorine or bromine.

A thermal plasma is broadly defined for the purpose of the present invention as the phenomena which occurs when sufficient energy is imparted to a gas under at least about 1 atmosphere of pressure to maintain at least about 10% of the atoms of said gas at above the ionization potential thereof. Several methods exist by which suitable thermal plasmas can be formed. One such method is that most commonly realized in an AC or DC plasma torch wherein an electrically induced arc is formed between two electrodes one of which electrode is provided with an orifice. A flow of fuel gas is provided adjacent the arc and a plasma is formed within and about said arc and is discharged through said orifice.

An advantageous method for generating and maintaining a suitable thermal plasma comprises an "electrodeless discharge technique." In accordance with said technique, a thermal plasma is formed by heating a fuel gas to ionization temperatures within an induced field created by a high frequency current. By enclosing the ionization zone and providing a continuous flow of fuel gas to said ionization zone, a torch effect is produced. Generally speaking, frequencies of from about 0.4 megacycle to about 100 megacycles are used at power outputs of greater than about 2 kilowatts. A fuller understanding of thermal plasma formation by high frequency induction heating can be had when reference is made to Reed, "Plasma Torches," International Science and Technology, June 1962, pp. 42–48.

Suitable plasma fuels for the practice of the present invention are generally any of the elements of Group VIII of the Mendeleev Periodic Table. Such elements are characterized by their chemical inertness and their monatomic structure. Each of said characteristics is desirable in the present process. Argon is a particularly suitable fuel because it has a relatively low ionization potential in comparison to other members of the Group VIII elements. When other members of Group VIII are to be utilized, however, such as neon, helium, or xenon it will be advantageous to utilize argon as a "pilot" plasma and thereafter charge the desired fuel, possessing the higher ionization potential into the ionization zone.

Generally speaking, any essentially pure carbon can be utilized as the feedstock. For instance, carbon blacks such as channel black, furnace black or thermal black which have not been treated so as to provide substantial quantities of elements other than carbon thereon can obviously be utilized. Other essentially pure carbon materials which are normally utilizable are gas coke, oil cake, graphite, coal and the like. It should be noted that the presence of substantial amounts of other elements in the feedstock such as oxygen, sulfur or hydrogen should be avoided when possible. The presence of such elements can result in substantially lower carbon black product yields and/or halogen by-product recovery when present in the feedstock in amounts of more than about 5 weight percent.

The method by which the carbon feedstock is charged into the thermal plasma is not normally critical provided that said charging is accomplished in a relatively precise and continuous manner. For instance, when finely-divided carbon blacks are utilized as the feedstock said blacks can normally be entrained in the plasma fuel. Another suitable method for providing the carbon feedstock to the plasma zone resides in the use of a sacrificial carbon electrode or rod which is fed into the plasma zone at the desired rate.

Process parameters such as residence time of the feedstock in the plasma and plasma temperature, feedstock rates, etc., are generally not critical provided that said conditions produce substantially complete dissociation of the feedstock carbon. Generally, the temperatures provided by thermal plasmas are sufficient (at least about 6000° K. and often above about 10,000° K. to provide said dissociation of the carbon feedstock over a broad range of feedstock charge rates. In any case, it is well within the purview of the art to alter plasma conditions and/or feedstock charge rates to provide said dissociation.

Having produced thorough dissociation of the carbon, the plasma effluent is contacted with chlorine or bromine. Although said contact can be achieved and cooling of the product black simultaneously effected by charging said chlorine or bromine into the fresh plasma effluent it will generally be advantageously economic to first cool said effluent by any suitable means and thereafter effect contact thereof with the chlorine or bromine. Said cooling can be achieved in any suitable manner. For instance, it is known that thermal plasmas generally suffer substantial heat losses through radiation. Said phenomenon can be utilized to advantage by allowing the thermal plasma to cool by radiational losses and thereafter charging thereinto the chlorine or bromine, for instance by introducing the halogen somewhat downstream from the tail flame of plasma zone. Another suitable method for cooling resides in charging into the plasma effluent a cool inert gas, advantageously the same element as utilized as the plasma fuel gas. In any case, the temperature of the plasma effluent should not be reduced to below carbon recombination temperatures, i.e. to less than about 2500° F. prior to contact thereof with the halogen. Preferably, said temperature will be reduced to between about 3000° F. and about 5500° F. at the time of said contact.

The halogen can be introduced separately into the plasma effluent or can be entrained in an inert carrier gas. Obviously, if a carrier is utilized, it is advantageous that it be of the same type as the plasma fuel gas. The concentration of halogen utilized can vary substantially. Generally, treatment with at least about 1 atom of the halogen per 5 atoms of the carbon will provide sufficient halogen concentration. It should again be noted that the yield of amorphous carbon black product achieved depends greatly upon the amounts and kinds of other elements present in the carbon feedstock. When oxygen or sulfur are present in only very minor quantities, said yield can approach 100 percent of theoretical. However, when the concentration of oxygen or sulfur is great, i.e. above about 5 weight percent, and particularly when the adulterant is oxygen, said yield can be greatly reduced. Moreover, if sulfur or hydrogen is present at least a portion of the halogen utilized downstream from the plasma zone will be converted to the hydrogen or sulfur halide which can render efficient recovery of the halogen difficult.

A better understanding of the process of the present invention can be had by reference to the following non-limiting example:

Example

Into electrodeless thermal plasma apparatus of the type shown in the figure having a quartz glass enclosure 1 of about 40 mm. diameter and 15" length, there is charged through conduit 3 about 32 s.c.f.h. of argon. Electric current of about 5 megacycles/second frequency is supplied to copper coils 5 by a 20 kw. high frequency convertor. The plasma is initiated by introducing tungsten wire 7 into plasma zone 9. The conductive wire heats to incandescence in the electric field and serves to depress the breakdown potential of the argon. As soon as the plasma is formed said wire is withdrawn from the plasma zone. The pressure of the resulting plasma is determined to be about 2.5 cm. Hg.

Next, there is additionally charged into conduit 3 a gas furnace type carbon black having a volatiles content of about 1% by weight at a rate of about 60 grams/hour. Said carbon black is entrained in the argon passing through said conduit and is introduced therewith into the plasma. The temperature of the plasma flame at the central-most portion thereof is determined to be about 10,000° K.

The plasma effluent flows, without exposure to the atmosphere, into enclosed cooling zone 11 having an enclosure comprising a quartz glass tube 75 mm. in diameter and about 4" in length. There is continuously charged into said cooling zone through conduit 13 positioned about ½" below the downstream end thereof argon at a rate of about 40 grams/hour.

The temperature of the effluent at a point about ¾" from the downstream end of the cooling zone is determined to be about 4500° F.

The effluent black product is then cooled to about 70° F, collected, and analyzed by electron microscope and X-ray diffraction. Results of said analyses are found in the table below in the column "Plasma Black, Untreated."

The black producing process is continued and there is charged into the cooling zone via conduit 13 about 10 grams/hour argon and about 30 grams/hour chlorine. The resulting product is collected and analyzed (table, column "Plasma Black, chlorine treated").

Next, the run is continued and, instead of a chlorine/argon mixture, there is introduced through conduit 13 about 10 grams/hour argon and about 70 grams/hour bromine. The resulting black product is cooled to about room temperature collected and analyzed (table, column "Plasma Black, bromine treated").

For comparative purposes, there are also shown in the table average analytical results of tests conducted on various commercial carbon blacks produced by prior art techniques.

TABLE

| | Percent crystallinity (graphite= 100%) (X-ray diffraction) | E.M. particle diameter (Angstroms) |
|---|---|---|
| Channel carbon black | 15 | 280 |
| Channel carbon black heat treated in an inert atmosphere at 2,800° C. for 2 hours | 20 | 280 |
| Oil furnace carbon black | 20 | 290 |
| Gas furnace carbon black | 23 | 800 |
| Thermal carbon black | 30 | 2,150 |
| Acetylene black | 12 | 500 |
| Plasma black, untreated | 35 | 370 |
| Plasma black (chlorine treated) | <1 | 400 |
| Plasma black (bromine treated) | <1 | 400 |

Obviously, many changes can be made in the above example and description without departing from the scope and spirit of the invention. For instance, although in the example the halogen is introduced as a mixture thereof with an inert gas, obviously it can be introduced alone. Moreover, said halogen can be contacted with the plasma effluent at any point in the reaction stream provided, of course, that substantial recombination of the carbon has not occurred.

It should be noted that substantially complete recovery and reuse of the plasma effluent can generally be effected. Generally, the effluent, upon cooling consists of a mixture comprising carbon black, halogen, and the plasma fuel. The solid black product can be collected by any convenient means such as bag filters, cyclone separators and the like. The remaining gaseous components can thereafter be separated such as by refrigeration of the stream to below the dewpoint of the halogen. Thereafter, the separated plasma fuel and halogen can be recycled to the black producing process as desired.

What is claimed is:

1. A process for producing amorphous carbon black which comprises:
    (a) providing a thermal plasma having a temperature of at least about 6000° K. plasma fuel elements of Group VIII of the Mendeleev Periodic Table,
    (b) charging carbon feedstock into said thermal plasma,
    (c) treating the resulting plasma effluent at above about 2500° F. with chlorine or bromine, and
    (d) recovering the resulting carbon black as product.
2. The process of claim 1 wherein said thermal plasma fuel is argon.
3. The process of claim 1 wherein said plasma effluent is treated with chlorine.
4. The process of claim 1 wherein said plasma effluent is treated with bromine.
5. The process of claim 1 wherein said plasma effluent is cooled to between about 3000° F. and about 5500° F. prior to treatment with chlorine or bromine.

References Cited

UNITED STATES PATENTS

| | | | |
|---|---|---|---|
| 3,009,783 | 11/1961 | Sheer et al. | 23—209.3 |
| 3,140,192 | 7/1964 | Jordan et. al. | 106—307 |
| 3,331,664 | 7/1967 | Jordan | 23—209.3 |
| 3,344,051 | 9/1967 | Latham | 204—173 |

EDWARD J. MEROS, *Primary Examiner.*

U.S Cl. X.R.

23—209.2; 106—307; 204—164

UNITED STATES PATENT OFFICE
CERTIFICATE OF CORRECTION

Patent No. 3,431,074 March 4, 1969

Merrill E. Jordan

It is certified that error appears in the above identified patent and that said Letters Patent are hereby corrected as shown below:

Column 5, line 19, after "6000° K." insert -- utilizing as the --.

Signed and sealed this 7th day of April 1970.

(SEAL)
Attest:

Edward M. Fletcher, Jr.
Attesting Officer

WILLIAM E. SCHUYLER, JR
Commissioner of Patents